May 25, 1965 H. W. GANS 3,185,904
CERAMIC DISK TRIMMING CONDENSER
Filed Feb. 21, 1963 2 Sheets-Sheet 1

INVENTOR
HEINRICH WERNER GANS
BY
Peter H. Behrendt
ATTORNEY.

May 25, 1965 H. W. GANS 3,185,904

CERAMIC DISK TRIMMING CONDENSER

Filed Feb. 21, 1963 2 Sheets-Sheet 2

INVENTOR
HEINRICH WERNER GANS
BY
Peter H. Behrendt
ATTORNEY.

United States Patent Office 3,185,904

Patented May 25, 1965

3,185,904

CERAMIC DISK TRIMMING CONDENSER

Heinrich Werner Gans, Ruckersdorf uber Nurnberg, Germany, assignor to Stettner & Company, Lauf (Pegnitz), near Nurnberg, Germany, a Kommanditgesellschaft of Germany Filed Feb. 21, 1963, Ser. No. 260,262
Claims priority, application Germany, Dec. 13, 1962, St 20,070
16 Claims. (Cl. 317—249)

This invention relates to a ceramic disk trimming condenser comprising a stator and a rotor held in close association by spring means and being rotatable against each other on a central shaft which also serves as the connection to the terminal for the rotor. The condenser of the invention is fined, generally, within the cylindrical area occupied by the stator and rotor.

Presently available disk trimming micro-condenser usually do not go below a size of about 4 tenths of an inch (10 mm.) diameted for the two cylindrical condenser parts. This is still too large for microcircuits. The problems, therefore, arose how to form substantially smaller condensers.

Disk trimming condensers provided with an elastomer plate to effect the clamping together of stator and rotor are known. The terminal arrangement in this type of condenser provides for terminals attached to a lateral projection on the stator which itself has a special aperture for the lead. This design has two shortcomings. The laterally protruding shape takes up too much space and the additional aperture in the body of the stator causes difficulties in manufacture which become worse with decreasing dimension and which tend to interfere with mass production methods, if it is desired to maintain certain mechanical and electrical standards.

In another type of trimming condenser an arrangement is provided wherein the lead passes through an eccentric bore parallel to the central axis. Evidently, with this type it also becomes more and more difficult, with decreasing size, to provide for two longitudinal bores in the body of the stator. As a result it is no longer possible, at least for large scale production, to remain within the required tolerances of minimum wall thickness and mechanical strength.

The lower dimensional limits for these condensers therefore, were 4 tenths of an inch (10 mm.) and even then this form of electrical connection for the stator coating was not very practical. With a stator diameter of, for instance, 2.8 tenths of an inch (7 mm.) this kind of connection could no longer be used.

It is therefore an object of the invention, broadly, to form a disk trimming condenser for use in micro-circuits which can be made by mass production methods to dimensions below 4 tenths of an inch without impairment of the mechanical and electrical properties.

More specifically, it is an object of the invention to form a disk trimming condenser which takes up very little space and, specifically, is provided with leads to the stator and rotor coatings which are confined within, generally, the cylindrical area occupied by the stator and rotor.

Still more specifically, the invention has the object to form a disk trimming condenser of the type and dimensions indicated which disposes with both lateral projections and a separate bore parallel to that of the main shaft and, still, is equipped with a reliable electrical connection between terminals and stator and rotor coatings.

A further objective of the invention is to provide leads for such micro-size condensers which, in addition, are secured against axial stress.

These objectives are accomplished in a general manner, by providing a lead in the form of a thin gauge sheet metal member passing in axial direction across the outer circumference of the stator body and having a flanged-over portion for making the electrical connection to the stator coating. The securement of the lead against axial stress is accomplished by either by another flange on the opposite side of the lead or by having the lead abut against a circumferential but recessed shoulder on the stator. In this manner it is possible to form ceramic condensers of a diameter even below 2.8 tenths of an inch (7 mm.) without impairment of the mechanical or electrical properties.

If the stator and rotor are held together under tension by, for instance, a silicone elastomer disk the parts are thereby also electrically insulated against each other. If, on the other hand, stator and rotor are held in association by a flat steel or bronze spring the insulation must be effected by means of a separate insulating disk. In order to limit the number of parts the stator in this case may be formed with a stub-like projection of reduced diameter at the face opposite that adjacent the rotor. A yoke-shaped terminal is then provided for the rotor which is forced against the stator stub by means of a plate spring held in place by the flanged end of the rotor shaft.

The rotor terminal should be secured against rotation relative to the stator body and the plate spring should likewise be secured against rotation relative to the rotor terminal. The plate spring may for this purpose be provided with tabs that rest against corresponding parts of the rotor terminal.

The two condenser coatings and their leads are thus insulated from each other and any loosening of the various parts because of repeated rotation during use is avoided.

The above described and other objects of the invention will now be illustrated by the following description of various embodiments of the invention which should be read together with the accompanying drawings in which.

Figures 1, 2, 3, 4, 5:
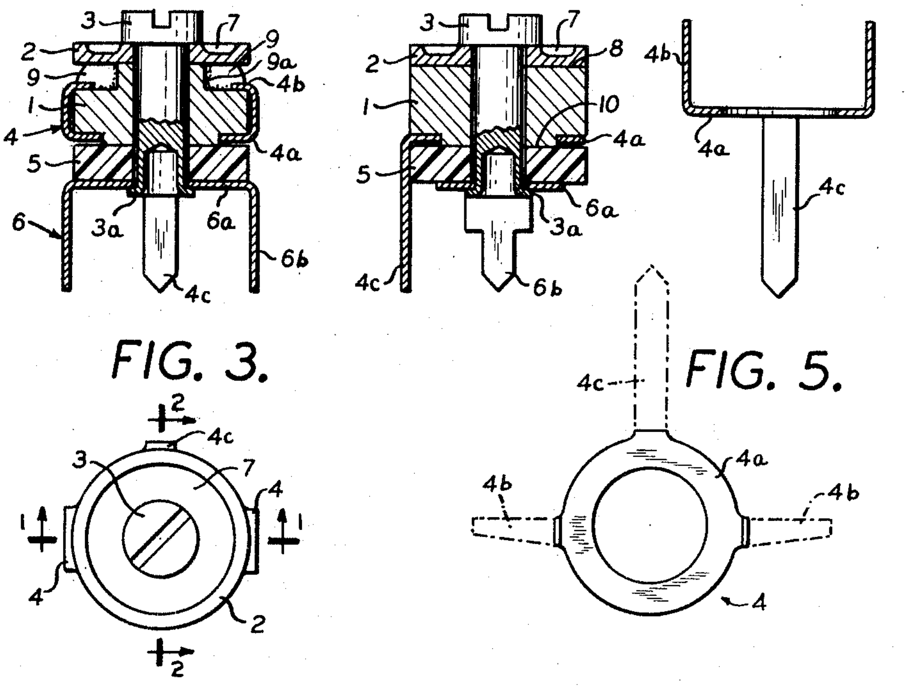
FIG. 1 is an enlarged vertical section through an embodiment of the condenser of the invention having a single full length central shaft and a disk type lead, the section being taken on lines 1—1 of FIG. 3.
FIG. 2 is another section through the same condenser along line 2—2 of FIG. 3.
FIG. 3 is an elevation of this condenser.
FIG. 4 is a vertical section through the stator lead and terminal of the condenser of FIGS. 1 to 3.
FIG. 5 is an elevation of this lead and terminal.

With reference, in the first place, to FIGS. 1 to 5, the trimming condenser comprises a ceramic stator 1 of cylindrical circumference which has, for instance, a diameter of 2.8 tenths of an inch and which has a bore to accommodate the full-length rotor shaft. The ceramic rotor disk 2 of a diameter equal to that of the stator is disposed on top of the stator and has a shaft 3 with the conventional slotted knob for adjusting the condenser. The shaft is in electrical contact with the conventional, for instance semicircular, electrically conductive rotor coating 7. The conductive stator coating 8, which may likewise be semicircular, is provided on the upper face of the stator adjacent the rotor disk.

The stator has two oppositely disposed recesses 9 which serve to receive the bent-over ends of the stator lead lugs *4b*. The stator lead 4 comprises a ring shaped disk *4a* of a thin gauge sheet metal which is provided with three lateral lugs as shown in FIG. 5 as *4b*, *4b* and *4c*. The lugs *4b* serve to embrace the stator member laterally, see FIG. 1, and are anchored on the body of the stator by means of their bent-over ends. They are in electrical contact, with the conductive coating 8 of the stator, for instance, through a part *9a* disposed within the recess 9 and having a baked-on noble metal coating which may be connected with the stator coating by soldering. The third lug *4c* of the lead 4 is of an extended length and is bent towards the opposite side so as to furnish the plug-in terminal for the stator coating.

The electrical connection with the rotor is effected through its shaft 3 and a yoke-shaped member 6 which comprises a central metal portion *6a* provided with two opposite down-turned extensions *6b*. The member 6 is held in place by the flanged end *3a* of the rotor shaft, which at its lower end is hollow. To obtain the necessary insulation and mechanical tension a silicone elastomer disk 5 is provided between the yoke-shaped rotor terminal 6 and the stator 1. The silicone disk may be replaced by a plate spring of steel or bronze in which case a separate insulating disk must be provided between spring and stator, as will be discussed below.

The second embodiment of the trimming condenser of the invention shown in FIGS. 6 to 9 likewise comprises a stator 11 and a superimposed rotor disk 12. The full length rotor shaft 13 is again connected with a yoke-shaped terminal 16, the central portion *16a* of which is being clamped down by the flange *13a* of the rotor shaft. The shanks *16b* of the yoke member form the terminals of the rotor. The electrical coatings of the rotor and stator are shown at 17 and 18, respectively.

Figure 6:
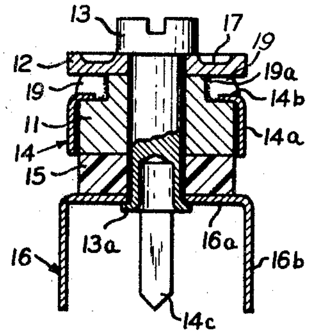
FIG. 6 is a section, similar to that of FIG. 1, through an embodiment of the invention having a cylindrical lead member.

The lead of the stator (FIG. 8) is formed by a cylindrical body 14 which comprises a main cylinder *14a*, a downwardly extending terminal lug *14c* and upwardly extending lugs *14b* which latter are adapted to be bent-over inwardly into the recesses 19 of the stator 11 when mounting the parts together, as shown in FIG. 6. The electrical contact with the stator coating can again be effected by a part *19a* and may be secured by soldering.

Figure 7:
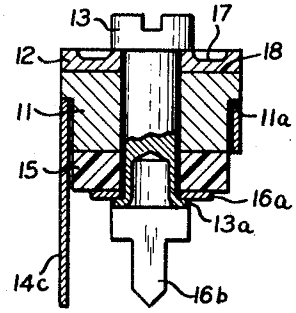
FIG. 7 is another section through the embodiment of FIG. 6, this section being taken at a 90° angle to that of FIG. 6.
Figure 8:
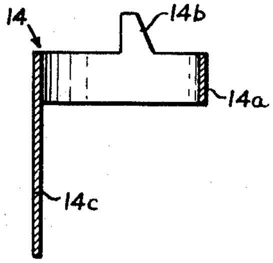
FIG. 8 is a vertical section through the stator lead and terminal of the second embodiment.
Figure 9:
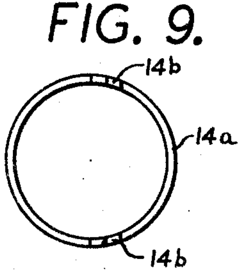
FIG. 9 shows the stator lead and terminal of this second embodiment in elevation.

As appears from FIG. 7 the cylindrical metal part of the lead member bears against a shoulder 11 of the stator. The mechanical association under tension is again effected by a silicone disk 15.

Figure 10:
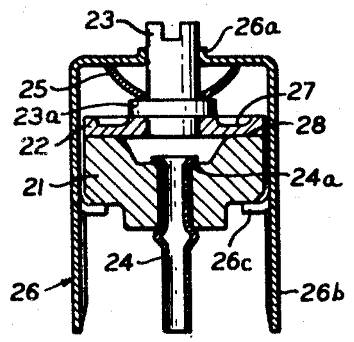
FIG. 10 shows a third embodiment of the invention wherein the rotor shaft ends short of the stator, this section being similar to that of FIG. 1 and 6 of the other embodiments.
Figure 11:
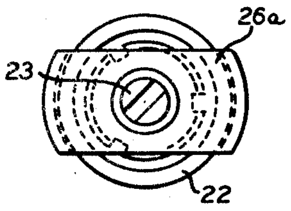
FIG. 11 is an elevation of this third embodiment.
Figure 13:
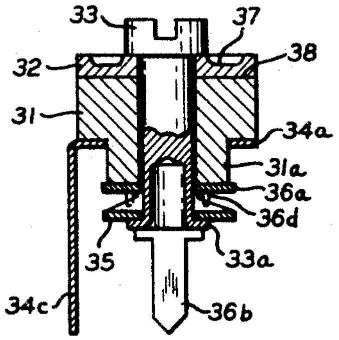
FIG. 13 is a section taken at a 90° angle to that of FIG. 12.
Figure 14:
FIG. 14 is a section through the spring employed in the embodiment of FIGS. 12 and 13.

The third embodiment of the invention shown in FIGS. 10 and 11 shows a condenser with a rotor shaft that ends short of the stator. On top of the stator 21 there is disposed the rotor disk 22 the rotation of which is controlled by the short shaft 23. The electrical connection for the stator in this case is effected by a metal tubing 24 which has a flanged inner end *24a* and which in any desired manner is connected with the stator coating 28. The conductive coating for the rotor is provided on the upper face thereof, as shown at 27.

The association of the parts of this condenser is effected by a yoke-shaped member 26 which encircles both the stator and the rotor and is provided with a central bridge portion *26a* at its upper end through which penetrates the short rotor shaft 23 and which serves as a bearing and guide member for the same. The shanks *26b* of the yoke member form the rotor terminals. The yoke member, in addition, is provided with lugs *26c* intermediate its length which bear against the bottom face of the stator. The necessary tension for the total assembly is furnished by a leaf spring 25 disposed between the inner face of the central bridge portion *26a* of the yoke and a flange *23a* formed on the rotor stub 23.

Figure 12:
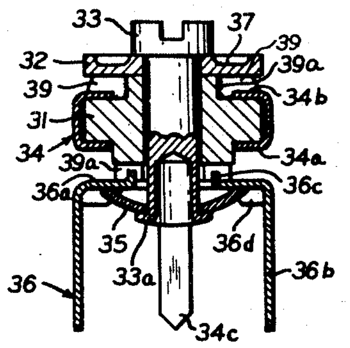
FIG. 12 is a vertical section on an enlarged scale through still another embodiment of the invention.

A still further embodiment is illustrated in FIGS. 12 to 15. This device, in its main aspect, is similar to that of FIGS. 1 to 6 but the mechanical tension is obtained here by use of a plate spring. The condenser again comprises a cylindrical stator of a diameter of, for instance, 2.8 tenths of an inch (7 mm.) which is provided with a bore for the full-length rotor shaft. A ceramic rotor disk 32 of similar diameter abuts on the stator and has a shaft 33 which is provided with the conventional slotted knob and is in electrical contact with the rotor coating 37. The stator has recesses 39 to receive the turned-in ends *34b* of the stator lead 34. This lead comprises a ring shaped sheet metal disk *34a* with three lateral lugs. The two lugs *34b* embrace the stator member laterally, as shown in FIG. 12, and are anchored on the body of the stator by means of the turned-in ends *34b*. They are in electrical contact, for instance, by a part *39a* disposed within the recesses 39 to make contact with the stator coating 38 disposed above the recesses. The third lug *34c* of the disk 34 is of an extended length and is bent to the other side to form the plug-in terminal of the stator coating.

The stator has a reduced diameter at its lower end to form a stub-shaped extension *31a*. There is thus formed an annular shoulder on the stator against which the disk of the stator lead 34 bears. The yoke-shaped rotor lead 36, on the other hand, with its central bridge portion *36a* is forced against the bottom face of the stub-like extension of the stator. The electrical connection of the rotor coating 37 is formed through the shaft 33 and yoke member 36 which latter has shanks *36b* constituting the terminals proper.

Figure 15:
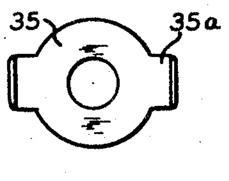
FIG. 15 is an elevational view of the spring.

The pressure on the bridge portion *36a* is obtained by a plate spring 35 of steel or bronze held in place by a flange *33a* of the rotor shaft 33. The spring is secured against rotation by two wings *36c* which enter two oppositely disposed notches *39a* of the stator portion *31a*. Instead, there may also be one single slot at the bottom of the stator stub which may be entered by the wings *36c*. The plate disk 35 thus provides the necessary tension for the end abutment between the rotor disk 32 and the stator 31. It is either formed of a disk-shaped circular plate spring or, preferably and as shown in FIG. 15, has lateral ears *35a* which bear against projections *36d* provided on the yoke-shaped rotor terminal to secure the spring against turning.

While several embodiments of the invention have been shown it will be appreciated that further modifications are possible within the scope of the invention and I wish, therefore, not to be limited otherwise than by the language of the appended claims.

What I claim and desire to secure by Letters Patent is:

1. A trimming condenser comprising
(*a*) two cylindrical operating members, one being a stator and the other being a rotor rotatable relative to said stator;
(*b*) resilient means for holding said operating members in end abutment;
(*c*) an electrically conductive coating on each of said operating members;
(*d*) terminal means for said operating members, and
(*e*) a lead for electrically connecting at least one of said conductive coatings with one of said terminal means, the said lead having a first portion extending parallel to the axis of at least one of said cylindrical operative members and formed with means abutting said operative member, said lead having a second, bent-in portion to form the electrical connection with one of said conductive coatings, means slidably rotatably securing said members, and said resilient means; and means secured to one of said operating members for rotating said member relative to said other operating member.

2. The trimming condenser of claim 1 wherein the said lead is formed of thin-gauge sheet metal.

3. The trimming condenser of claim 1 wherein said resilient means are formed by an elastomer disk disposed co-axially with said stator and rotor.

4. The trimming condenser of claim 1 wherein the resilient means are formed by a centrally apertured spring member disposed co-axially with said stator and rotor and wherein means are provided for securing said spring member against rotation.

5. The trimming condenser of claim 1, wherein said lead is formed with a terminal lug extending in a direction opposite to said first portion.

6. The trimming condenser of claim 1, wherein said lead comprises a yoke shaped member having shanks extending axially along and adjacent to the periphery of said stator and said rotor to form the terminals for said rotor, and a bridge portion formed as part of said yoke member said bridge portion being formed with a central opening; and means electrically connecting the electrically conductive coating on said rotor to said bridge portion.

7. In a trimmer condenser, a pair of disc shaped insulating support members, each having a conductive coating on an end face thereof, and formed with a single centrally located aperture; terminal means for one of said members extending axially through said aperture and in electrical contact with the coating of said one member; a terminal for the conductive coating of the other of said members, said terminal comprising a centrally apertured ring shaped portion, an axially extending portion, and a bent-over lug extending inwardly over an end face of said other support member and in electrical contact with said conductive coating on said other member, whereby the other disc shaped insulating support member will be located between said ring shaped portion and said lug; and means resiliently securing together, in end face abutting relation, said disc shaped insulating support members and said apertured ring shaped portion of said terminal.

8. The trimmer condenser as claimed in claim 7, wherein said other disc shaped insulating support member is formed with recesses on the end face having the conductive coating; and the bent-over lug of said terminal extends into said recess.

9. The trimmer condenser of claim 7, wherein said terminal is formed with a connecting lug extending at substantialy right angles to said ring shaped portion and in a direction opposite to said axially extending portion.

10. In a trimmer condenser, a pair of disc shaped insulating support members, a first one of said support members being formed with a recess, and having a shoulder on the circumferential surface; each of said support members having a conductive coating on an end face thereof and formed with a single centrally located aperture; terminal means for the other of said members extending axially of said aperture and in electrical contact with the coating of said other member; a terminal for the first one of said members, said terminal comprising a ring shaped portion, bearing against said shoulder of said first member, and an axially extending lug having a bent-over end extending inwardly over an end face of said support member and in electrical contact with said conductive coating thereon, whereby said terminal will be secured on said support member by said lug and bent-over end and by said sleeve bearing against said shoulder; and means resiliently securing together, in end face abutting relation, said pair of disc shaped insulating support members.

11. The trimmer condenser of claim 10, wherein the ring shaped portion compirses a sleeve axially extending along the circumferential surface of said first one support member.

12. A disc type trimmer condenser having a pair of cylindrical insulating supports, each having a conductive coating on one face, and formed with a central axial bore; a first terminal electrically connected to the conductive coating of one of said members; a second terminal; and means resiliently securing together said pair of cylindrical insulating supports, in stacked, axial alignment, said means passing through said bore; wherein said second terminal is a centrally apertured metal disc located in alignment with the said supports, having a first lug axially extending and bent-in and over the edges of the other of said supports to reach around the same and electrically connected to the coating thereon.

13. The trimming condenser of claim 12, wherein the metal disc and the lug are dimensioned and located to be generally within the circular area defined by the cylindrical insulating supports.

14. The trimmer condenser of claim 12 including a centrally apertured yoke shaped lead, electrically conductive spring means bearing against said lead, and a pin having enlarged ends passing through said central bore and the aperture of said yoke shaped lead, and securing together, in axial alignment, said stacked cylindrical supports, said spring means, and said lead.

15. The trimmer condenser of claim 14, wherein the spring means is a cup-type spring and provided with projecting lugs and the yoke shaped lead is provided with stop means cooperating with said lugs on the cup-type spring to prevent relative rotation of said spring, and yoke shaped lead.

16. The trimmer condenser of claim 12, the other of said supports having an axially extending stub of reduced diameter, said apertured metal disc of the second terminal being located on said stub.

References Cited by the Examiner

UNITED STATES PATENTS

| | | | |
|---|---|---|---|
| 1,603,041 | 10/26 | Gaudio | 317—249 |
| 2,499,634 | 3/50 | Ehlers et al. | 317—249 |
| 2,693,557 | 11/54 | Kodama | 317—249 |
| 2,913,644 | 11/59 | Bleazey | 317—249 |
| 2,913,645 | 11/59 | Hansen et al. | 317—249 |
| 3,137,808 | 6/64 | Coda et al. | 317—242 |

LARAMIE E. ASKIN, *Primary Examiner.*

JOHN F. BURNS, *Examiner.*